United States Patent [19]

Otonari et al.

[11] Patent Number: 4,973,515
[45] Date of Patent: * Nov. 27, 1990

[54] MAGNETIC CARD

[75] Inventors: Satoshi Otonari; Yoshinori Sato, both of Machida; Narihiro Masuda; Kazuyuki Akatsu, both of Yokohama, all of Japan

[73] Assignee: Diafoil Company, Ltd., Tokyo, Japan

[ * ] Notice: The portion of the term of this patent subsequent to Aug. 15, 2006 has been disclaimed.

[21] Appl. No.: 242,332

[22] Filed: Sep. 9, 1988

[30] Foreign Application Priority Data

Sep. 10, 1987 [JP] Japan ................................. 62-227200

[51] Int. Cl.$^5$ ............................................. G11B 23/00
[52] U.S. Cl. ................................ 428/315.5; 428/480; 428/692; 428/900
[58] Field of Search ................ 428/480, 315.5, 315.9, 428/483, 910, 694, 900, 692

[56] References Cited

U.S. PATENT DOCUMENTS

| | | | |
|---|---|---|---|
| 3,755,499 | 8/1973 | Heijo et al. | 260/873 |
| 3,937,754 | 2/1976 | Shimotsuma et al. | 428/480 |
| 4,654,249 | 3/1987 | Barbey et al. | 428/480 |
| 4,670,319 | 6/1987 | Katoh et al. | 428/480 |
| 4,781,963 | 11/1988 | Utsumi et al. | 428/480 |
| 4,857,396 | 8/1989 | Otonari et al. | 428/480 |

FOREIGN PATENT DOCUMENTS 50-28459  9/1975  Japan .

*Primary Examiner*—Paul J. Thibodeau
*Attorney, Agent, or Firm*—David G. Conlin; Linda M. Buckley

[57] ABSTRACT

Disclosed herein is a magnetic card comprising a monoaxially or biaxially stretched minute-cellular polyester film which has an apparent density of 0.4 to 1.3 g/cm$^3$ and an opacifying power of 0.2 or more and a magnetic layer applied on at least one surface of said film.

By using the polyester film containing small air bubbles as the base material of the magnetic card, flexibility, flatness and punching property, which were insufficient in a magnetic card using a conventional polyester film, are improved.

2 Claims, No Drawings

MAGNETIC CARD

DETAILED DESCRIPTION OF THE INVENTION

The present invention relates to a magnetic card having polyester base, and more particularly to a magnetic card having a base which is made of a polyester having minute closed cells on the surface and inside thereof, the magnetic card having excellent flexibility, flatness and punching quality.

Recently, as can be seen from the wide distribution of magnetic cards such as telephone cards and prepaid cards for use with railways, the information industry has progressed marvelously. The development of such magnetic cards accelerates the trendy cash-less concept and it has changed the conventional monetary concept.

In general, a magnetic card has the basic structure constituted in such a manner that a paper or a plastic sheet or film having the thickness of 0.2 to 1 mm is used as a base and a magnetic recording layer is provided on the former. The durability or the dimensional stability of the magnetic card much depends upon the characteristics of the above-described base.

Therefore, it is a very important factor to determine the material which serves as the base. It has been selected in accordance with the required characteristics in the field where the magnetic cards are used.

Conventionally, a polyester film, particularly, a biaxially stretched polyethylene terephthalate film has been preferably employed as the base material of the magnetic cards for use in fields in which high accuracy and reliability are required, because the polyester film has excellent mechanical characteristics, dimensional stability, chemical resistance and weatherability even when the thickness thereof is 0.3 mm or less and as well it is available cheaply.

However, although the polyester film has the above-described excellent characteristics, it is insufficient in the characteristics needed in practical use after it has been formed in a magnetic card. That is, the polyester film is a material having strong and rigid characteristics, therefore, it can be practically used in the thickness of 0.3 mm or less, but it lacks flexibility. Therefore, it cannot sufficiently contact with a magnetic head at the time of conducting magnetic recording and/or magnetic reading after it has been formed in a magnetic card. As a result of this, errors at the time of reading occur. Furthermore, in order to give the polyester film for use in such magnetic card an opacifying property, very large amount of a white pigment such as titanium oxide particles are added to the polyester film. This addition of a white pigment makes the film more rigid, causing the deterioration in flexibility thereof. Furthermore, when the film is wound up, it becomes curled, causing an insufficient flatness of the magnetic card due to the curl. Furthermore, there have been a problem pointed out that a large force is needed to punch the film to a card shape at the final finish work process of the magnetic card, causing the life of a knife to be shortened, and a problem also pointed out that it is difficult to stamp something thereon. Furthermore, on the practical use viewpoint, when a hole showing approximate remaining units of, for example, a telephone card is punched, failure of terminal equipments or decreasing in the life time thereof is caused as in the above-described case of punching the film.

Therefore, in order to overcome the above-described problems, the inventors of the present invention have studied for improving the characteristics of the polyester base by using a copolyester to provide the base with elasticity or by reducing crystallinity of the film. However, any significant effect could not be obtained in vain. Therefore, a radical improvement in the characteristics of the polyester or a novel material other than polyester have been required.

The present inventors therefore studied in order to improve the flexibility, flatness and punching properties of the polyester film which serves as the base material of a magnetic card while maintaining various excellent characteristics of the polyester film. As a result, the present inventors have found that a monoaxially or biaxially stretched polyester film containing minute closed cells and having an apparent density of 0.4 to 1.3 g/cm$^3$ and an opacifying power of 0.2 or more can meet the above-described objects. The present invention has been accomplished based on this finding.

SUMMARY OF THE INVENTION

In an aspect of the present invention, there is provided a magnetic card comprising a mono- or biaxially stretched minute-cellular polyester film which has an apparent density of 0.4 to 1.3 g/cm$^3$ and an opacifying power of 0.2 or more and a magnetic layer applied on at least one side of the film.

A magnetic card according to the present invention is a card having the basic structure comprising a polyester film serves as the base thereof and a magnetic layer for conducting magnetic recording which is applied in part or the entire surface of one side or both sides thereof.

Examples of using such magnetic card can be exemplified by, in addition to the telephone card, a car parking ticket for use in an automatic gate, express high way ticket, passenger ticket, season ticket, airline ticket, commutation ticket, credit card, and cash card. The field of application of the magnetic card according to the present invention is not limited to those exemplified above. Therefore, the shape of the card is cut in accordance with each usage, and is not limited.

The present invention is characterized in that a polyester film containing minute cells on the surface and inside thereof is used as the base material for magnetic cards. The apparent density of the polyester film is 0.4 to 1.3 g/cm$^3$, preferably 0.6 to 1.3 g/cm$^3$, and more preferably 0.8 to 1.3 g/cm$^3$. The opacifying power is 0.2 or more, and preferably 0.3 or more.

If the apparent density exceeds 1.3 g/cm$^3$, the amount of the contained minute cells becomes reduced. As a result, any significant improvement effect in the flexibility of the film or punching properties thereof cannot be obtained. On the other hand, if it is less than 0.4 g/cm$^3$, the mechanical strength of the film becomes insufficient.

Meanwhile, if the opacifying power is less than 0.2, the diameter of the closed cells contained in the film can be excessively enlarged, causing the reduction in the mechanical strength as well as roughened surface of the film. As a result of this, it is not preferable because the adhesion between the base film and the magnetic layer becomes insufficient and a print quality becomes not clear.

It is also important that the polyester film used in the present invention is monoaxially or biaxially stretched. The stretch ratio is 4 times or more, preferably 9 to 20 times, in the areal ratio. In general, non-stretched polyester film is excessively low in its mechanical strength. Therefore, if a non-stretched polyester film is used as the base for a magnetic card, the necessary and sufficient strength and durability cannot be obtained.

The polyester film containing minute cells according to the present invention may be subjected to surface treatment such as a corona treatment or a primer treatment at any stage before the formation of the magnetic layer for the purpose of improving its surface characteristic such as wettability or adhesion.

A method of producing the minute cellular polyester film which serves as the base material of a magnetic card according to the present invention is not limited particularly as far as the produced film contains minute cells and has the above-described characteristics and requirements.

Hitherto, a number of methods has been proposed for producing cellular polyester. For example, a method of incorporation of a gas or a gasifiable substance disclosed in Japanese Patent Application Laid-Open (KOKAI) No. 50-38765 (1975) and Japanese Patent Publication No. 57-46456; a method of incorporation of a substance capable of generating a gas by chemical decomposition disclosed in Japanese Patent Application Laid-Open (KOKAI) No. 52-43871 (1977) and Japanese Patent Publication No. 58-50625 (1983); and a method which comprises mixing a material for film with a substance soluble in a solvent, forming the resultant mixture in the form of a film, impregnating the film in the solvent to extract the substance from the film as disclosed in Japanese Patent Application Laid-Open (KOKAI) No. 51-34963(1976) and Japanese Patent Publication No. 52-27666(1977) can be cited. Any of the above-described methods can be employed. However, since the above-described methods necessitates a special forming apparatus or involves complicated process, it is not easily employed.

Therefore, it is preferable to employ a method disclosed by the present inventors in Japanese Patent Application No. 313896/1986 as a method of easily obtaining the polyester film containing minute cells used in the present invention.

That method comprises mixing a specific polypropylene with polyester extrusion it in a form of a sheet, and stretching the sheet in monoaxial or biaxial directions, whereby a film is formed. The method will be in detail described below. Crystalline polypropylene homopolymer having a melt flow index (abbreviated to "M.F.I." hereinafter) of 0.2 to 120 is mixed with 3 to 40 wt% of polyester, and the mixture is melted and extruded into a substantially amorphous sheet. Next, the sheet is monoaxially or biaxially stretched with the areal stretch ratio of 4 times or more, thereby obtaining a polyester film containing numerous minute closed cells on the surface and inside thereof.

By employing the above-described method, a monoaxially or biaxially stretched minute-cellular polyester film which serves as a base material of a magnetic card according to the present invention can be easily obtained, having an apparent density of 0.4 to 1.3 g/cm$^3$ and an opacifying power of 0.2 or more. Furthermore, since the minute-cellular polyester can be manufactured with a conventional film-forming apparatus and under the conventional film forming conditions, a great merit can be obtained including a merit of reducing the manufacturing cost.

This method will be further in detail described. The crystalline polypropylene homopolymer mixed in the above-described method is a polymer in which at least 95 mol% or more, and preferably 98 mol% or more of the constitutional repeating unit is a propylene unit. As the other constitutional units which may be obtained, ethylene unit, butylene unit and isoprene unit may be mentioned. That is, if a non-crystalline polypropylene is made an amorphous sheet, it bleeds out into the surface of the sheet, causing the surface of a cooling drum or stretch roll or the like to become contaminated. Meanwhile, if a polypropylene having, for example, 10 mol% or more of ethylene unit, the amount of minute cells contained in the film becomes insufficient.

The M.F.I. of the crystalline polypropylene homopolymer is 0.2 to 120, preferably 0.5 to 50. If the M.F.I. is less than 0.2, the size of the generated cells becomes excessively large, causing frequent bursts at the time of stretching. On the other hand, if the M.F.I. exceeds 120, the sheet slips off from clips during the stretching by using a tenter. The above-described cases are not preferable because the productionality is deteriorated.

The amount of the crystalline polypropylene homopolymer to be mixed with polyester is 3 to 40 wt%, preferably 5 to 20 wt% based on the amount of the polyester. If the amount is less than 3 wt%, the amount of generated minute cells is too small, therefore, it becomes difficult to obtain a polyester film having an apparent density of not higher than 1.3 g/cm$^3$. On the other hand, if it exceeds 40 wt%, it is not preferable because burst occurs at the time of stretching.

In the present invention, it is necessary that the amorphous sheet is stretched at least in monoaxial direction. The reason for this lies in that, in addition to the above-described object of giving a mechanical strength, the minute and closed cells cannot be obtained by merely mixing the polyester and the crystalline polypropylene homopolymer, but it can be obtained by employing the stretching process.

The method of stretching does not need any special condition. It can employ the conditions similar to those in a case where usual polyester film is manufactured.

That is, a mixture of polyester and the crystalline polypropylene homopolymer is melted at 250° C. to 300° C. in an extrusion machine and is extruded into the form of a sheet through a die. Next, it is cooled down below about 70° C. to be made a substantially amorphous sheet. Then, this sheet is stretched in the machine and/or transverse direction by 4 times or more, preferably 9 to 20 times in the areal stretch ratio. Then, by thermal treatment at 120° to 250° C., a polyester film having a thickness of 50 to 500 μm, preferably 100 to 350 μm, an apparent density of 0.4 to 1.3 g/cm$^3$ an opacifying power of 0.2 or more, and minute cells of a diameter of 1 to 300 μm, preferably 5 to 100 μm. The biaxial stretching may be conducted in either way of simultaneously biaxial stretching or successively biaxial stretching. The stretch ratio in the machine direction is 2 to 5 times, preferably 2.5 to 4 times, and the stretch ratio in transverse direction is 2 to 5 times, preferably 2.5 to 4 times.

As described above, a white polyester film containing minute cells and having excellent opacifying power can be manufactured. If the basic characteristics of the minute-cellular polyester film cannot be deteriorated, each additive may be mixed. This additive can be exemplified by antioxidant, ultraviolet light absorber, lubricant, antistatic agent, dye, pigment, fluorescent whitener, matting agent, and surface-active agent. The above-described additives can be added in a proper method and by proper quantity according to demand.

The polyester used in the present invention is a polyester prepared by polycondensing an aromatic dicarboxylic acid component such as terephthalic acid, isophthalic acid or naphthalene dicarboxylic acid and esters thereof; and a glycol component such as ethylene glycol, di-ethylene glycol, 1,4-butanediol, neopentyl glycol, and 1,4-cyclohexane dimethanol.

The polyesters can be prepared by directly reacting the aromatic dicarboxylic acid component and the glycol component, and it can also be prepared by transesterification of the alkyl ester of the aromatic dicarboxylic acid with the glycol component, and then polycondensing them. It can be as well prepared by polycondensing di-glycol ester of the aromatic di-carboxylic acid.

The above-described type of polyester can be exemplified by polyethylene terephthalate, polyethylene-2,6-naphthalate and polybutylene terephthalate.

This polyester may be a homopolyester or a copolyester. In either way, a preferred polyester used in the present invention comprises 70 mol% or more, preferably 80 mol% or more, and more preferably 90 mol% or more of the constitutional repeating units thereof are ethylene terephthalate unit, ethylene 2,6-naphthalate unit, butylene terephthalate unit or the mixture of them. If the degree of polymerization of the polyester is too low, the mechanical strength is deteriorated. Therefore, the intrinsic viscosity thereof is 0.4 or more, preferably 0.5 to 1.2, and more preferably 0.55 to 0.85.

In general, polyester may contain a surface roughener, that is, fine inactive particles, in a proper amount for the purpose of giving the film an appropriate slipperiness. However, it is preferable not to contain the above-described particles in the present invention. The reason for this lies in that the presence of these particles causes delicate change of the whiteness or the touch of the obtained film. However, as far as the required characteristics of the film to be obtained are not affected, such particles may be contained.

The magnetic layer employed in the present invention is not a special one, therefore that used for the conventional magnetic card may be used. For example, a so-called coat-type magnetic layer comprising finely dispersed powdery magnetic material such as $\gamma$-$Fe_2O_3$, Co-coated $\gamma$-$Fe_2O_3$ or barium ferrite ($BaFe_{12}O_{19}$) in a binder such as a urethane resin and nitrocellulose is preferably used, but the present invention is not limited to this.

The method of forming a magnetic layer on the minute-cellular polyester film is not limited. The magnetic layer may be directly formed on the polyester film base by applying a magnetic material mixture, or the magnetic layer may be formed by adhering a previously manufactured transfer magnetic tape on a polyester base film with an adhesive. The thickness of the magnetic layer is in general 1 to 10 $\mu$m.

In the magnetic card according to the present invention, as far as the basic characteristics, that is, the magnetic recording, reproduction and erasing characteristics, are not deteriorated, a further application of a print layer or surface protective layer may be conducted.

Since the thus-obtained magnetic card according to the present invention comprises, as its base material, a polyester film containing a numerous closed cells, a magnetic card exhibiting excellent flexibility with less rigidity compared with the conventional magnetic card which uses, as its base material, the conventional polyester film can be obtained. By this improvement in flexibility, the close contact between a magnetic card and a magnetic head can be improved and the number of occurrence of troubles such as errors in reading can be significantly decreased.

Furthermore, since the polyester film containing minute cells which serves as the base material in the present invention has an excellent opacifying power, the amount of use of white pigment can be significantly reduced, while the white pigment has been added by a large amount in order to give opacifying power to the conventional polyester film. In addition, punching property for forming a card can be significantly improved, whereby the productivity can be significantly improved.

Furthermore, since the amount of the white pigment to be added can be reduced, the rolled-shape deformation of the polyester film can be prevented. As a result, the curl forming phenomenon can be overcome, and an excellent flatness can be obtained, therefore, the quality of a magnetic card has been significantly improved.

The present invention will now be described more in detail with reference to the following non-limitative Examples. In the present invention, the various characteristics are measured and evaluated in the following manner.

(1) APPARENT DENSITY (g/cm$^3$)

Apparent A 10×10 cm square was cut as a sample from a desired part of a given film. The volume of this sample was calculated using the average thickness obtained by measuring thicknesses thereof at nine arbitrarily chosen points of the sample with a micrometer and averaging the values of measurement.

The sample was weighed and the weight thereof per cm$^3$ was reported as an apparent specific gravity of the given film. This determination was conducted on five samples and the average of five values was employed as the result of the determination.

(2) OPACIFYING POWER

By the use of a densitometer, Macbeth TD-904 model, the density of transmitted light through a given film was measured under Filter G to find the opacifying power. The numerical value thus found increases with increasing opacifying power.

(3) STIFFNESS $\Theta$ (deg.)

A test piece of 12.7 mm in width and 150 mm in length was cut out from a sheet on which a magnetic layer had been formed. This test piece was horizontally fixed with the part of 127 mm length from one end overhung. A weight of 0.9 g was attached to the front end of the thus-overhung test piece to be allowed to hand down. The horizontal distance (a) mm between a point which is vertically lower by 30 mm from the fixing point at which the test piece was fixed and the hanging film is measured. From an equation $\tan \Theta = a/30$, the hanging angle $\Theta$ (deg.) was obtained to be made the stiffness. The measurement was repeated three times, and the average value was employed as the resulted value. It is indicated that a smaller value shows the more excellent flexibility.

(4) CUTTING STRENGTH (kg·cm/cm$^2$)

The strength of a test piece 5 cm × 5 cm in size which was cut out from a film to which a magnetic layer had been formed was measured according to JIS P-8116. Three places were measured, and the average value was employed as the resulted cutting strength. It is indicated that a smaller value a more excellent punching property.

(5) EVALUATION OF FLATNESS

A continuous sheet on which a magnetic layer had been formed was wound to a core having the diameter of 6 inches, and the thus-wound film was allowed to stand at 45° C. for 48 hours. Next, a test piece 10 cm × 10 cm which was cut out therefrom was placed on a horizontal plane so as to observe the degree of curl of the test piece. The test pieces was evaluated by classifying them into the following three ranks.

Rank A . . . . . excellent flatness without any curls observed
Rank B . . . . . slightly insufficient flatness with very small and not so appreciable curls obtained
Rank C . . . . . insufficient flatness with marked curls observed

EXAMPLE 1

Crystalline polypropylene homopolymer chips having the M.F.I. of 10 is uniformly blended with 5 wt% of polyethylene terephthalate chips having an intrinsic viscosity [η] of 0.652 and containing 5 wt% of white pigment of 0.3 μm titanium oxide. The thus-blended materials were melted at 290° C. and was extruded in the form of a sheet by an extruder on to a cooling drum at 40° C. so as to obtain an amorphous sheet having the thickness of 1.65 mm. Next, the thus-extruded sheet was stretched 3 times in the machine direction and 3.2 times in the transverse direction, and was heat-treated at 240° C. for 5 seconds. Consequently, a white biaxially oriented polyester film which contains minute cells and has a thickness of 200 μm, an apparent density of 1.21 g/cm$^3$, and an opacifying power of 1.9 was obtained.

By using the minute-cellular polyester film obtained above as the base material, a magnetic layer having a dry thickness of 5 μm was formed on the base material. That is, after mixing and dispersing for 48 hours, in a ball mill, 150 parts by weight of γ-Fe$_2$O$_3$, 40 parts by weight of polyurethane resin, 20 parts by weight of nitrocellulose, 5 parts by weight of lecithin, 100 parts by weight of methyl isobutyl ketone, and 300 parts by weight of methyl ethyl ketone, 5 parts by weight of polyisocyanate compounds were added to obtain a magnetic paint. It was then applied to the minute-cellular polyester film and was dried so as to form a magnetic layer. As a result of this, a magnetic film was obtained.

The thus-obtained magnetic film was cut out into a proper sized card, and the characteristics of this magnetic card were evaluated, resulting excellent flexibility, punching property and flatness. The results are shown in Table 1.

EXAMPLE 2

A biaxially stretched minute-cellular polyester film having a thickness of 200 μm was obtained in a manner similar to Example 1, except that polyethylene terephthalate chips of [η] 0.660 containing no white pigment were used instead of the polyester chips used in Example 1 and that polypropylene was mixed by 10 wt%. Next, in the manner similar to Example 1, a magnetic card was obtained. The apparent density of the minute-cellular polyester film which served as a base material was 1.03 g/cm$^3$ and the opacifying power thereof was 1.6.

The thus-obtained card, similarly to that of Example 1, exhibited excellent flexibility, punching property and flatness.

COMPARATIVE EXAMPLE 1

A biaxially stretched minute-cellular polyester film having a thickness of 200 μm and a magnetic film were obtained in a manner similar to Example 1, except for using no crystalline polypropylene homopolymer.

The apparent density of the minute-cellular polyester film which served as a base material was 1.41 g/cm$^3$ and the opacifying power thereof was 0.1. The flexibility was insufficient and the punching property and the flatness were also insufficient, as shown by the results in Table 1.

COMPARATIVE EXAMPLE 2

A biaxially stretched minute-cellular polyester film and a magnetic card having a thickness of 200 μm were obtained in a manner similar to Example 1, except for using a polyethylene terephthalate chips of [η] 0.655 containing 15 wt% of white pigment (titanium oxide having the average particle size of 0.3 μm) instead of the polyester chips used in Example 1. The thus obtained polyester film was a white film and had an apparent density of 1.48 g/cm$^3$ and an opacifying power of 1.8.

It was further inferior to the magnetic card obtained in Comparative Example 1 in its flexibility, punching property and flatness.

The results of the measurements of the characteristics according to Examples 1 and 2 and Comparative Examples 1 and 2 are collectively shown in the following Table 1.

TABLE 1

| Example and Comparative Example | Characteristics of base material | | Characteristics of Magnetic Card | | |
|---|---|---|---|---|---|
| | Apparent Density (g/cm$^3$) | Opacifying Property | Stiffness θ (deg.) | Cutting Strength (kg · cm/cm$^2$) | Flatness (Rank) |
| Example 1 | 1.21 | 1.9 | White Pigment 4.8 wt % | 56 | 17 | A |
| Example 2 | 1.03 | 1.6 | — | 52 | 15 | A |
| Comparative Example 1 | 1.41 | 0.1 | — | 60 | 21 | C |
| Comparative Example 2 | 1.48 | 1.8 | White Pigment 15 wt % | 61 | 22 | C |

What is claimed is:

1. A magnetic card comprising a monoaxially or biaxially stretched minute-cellular polyester film which has an areal stretch ratio of at least about 4 times, an apparent density of 0.4 to 1.3 g/cm³ and an opacifying power of 0.2 or more and a magnetic layer applied on at least one surface of said film.

2. The magnetic card according to claim 1, wherein said polyester film comprises a polyester having an intrinsic viscosity of 0.4 or more in which 70 mol% or more of the constitutional repeating units is ethylene terephthalate unit, ethylene 2,6-naphthalate unit, butylene terephthalate unit or a mixture thereof, and 3 to 40 wt%, based on the amount of said polyester, of a crystalline polypropylene homopolymer having a melt flow index of 0.2 to 120 in which 95 mol% or more of the constitutional repeating units is propylene unit.

* * * * *